United States Patent [19]

Palaniappan et al.

[11] Patent Number: 5,084,662
[45] Date of Patent: Jan. 28, 1992

[54] UNIPOLAR CONVERTER FOR VARIABLE RELUCTANCE MACHINES

[75] Inventors: Rasappa Palaniappan, Michigan City, Ind.; John J. Dhyanchand, Rockford, Ill.; Lewis E. Unnewher, Michigan City, Ind.

[73] Assignee: Sunstrand Corporation, Rockford, Ill.

[21] Appl. No.: 503,763

[22] Filed: Apr. 3, 1990

[51] Int. Cl.$^5$ .................... G05B 19/40; H02K 29/02
[52] U.S. Cl. .................................. 318/701; 363/98; 363/138; 318/138
[58] Field of Search ........... 318/696, 700, 138, 701; 323/266; 363/98, 138, 41

[56] References Cited

U.S. PATENT DOCUMENTS

| | | | |
|---|---|---|---|
| 3,742,330 | 6/1973 | Hodges et al. | 323/266 |
| 4,074,179 | 2/1978 | Kuo et al. | 318/696 |
| 4,127,801 | 11/1978 | Leenhouts | 318/696 |
| 4,208,623 | 6/1980 | Leenhouts | 318/696 |
| 4,295,083 | 10/1981 | Leenhouts | 318/696 |
| 4,500,824 | 2/1985 | Miller . | |
| 4,570,212 | 2/1986 | Edwards et al. | 363/138 |
| 4,763,056 | 8/1988 | Byrne et al. . | |
| 4,783,795 | 11/1988 | Yahata | 323/266 |

FOREIGN PATENT DOCUMENTS

| | | | |
|---|---|---|---|
| 797047 | 11/1981 | U.S.S.R. . | |
| 900395 | 1/1982 | U.S.S.R. . | |
| 2208456 | 3/1989 | United Kingdom | 318/701 |

Primary Examiner—William M. Shoop, Jr.
Assistant Examiner—John W. Cabeca
Attorney, Agent, or Firm—Antonelli, Terry, Stout & Kraus

[57] ABSTRACT

The invention is a circuit (60) for controlling the operation of a variable reluctance machine having a plurality of phase windings. Pairs of phase windings (64, 66 or 65, 67) are controlled by a switching circuit having only three power switches which are controlled by a switch controller. Pairs of phase windings may be switched by one or more sets of switches each having the three power switches in several different modes of operation. The invention may be used to control multiple phase machines with an odd number of phases.

30 Claims, 6 Drawing Sheets

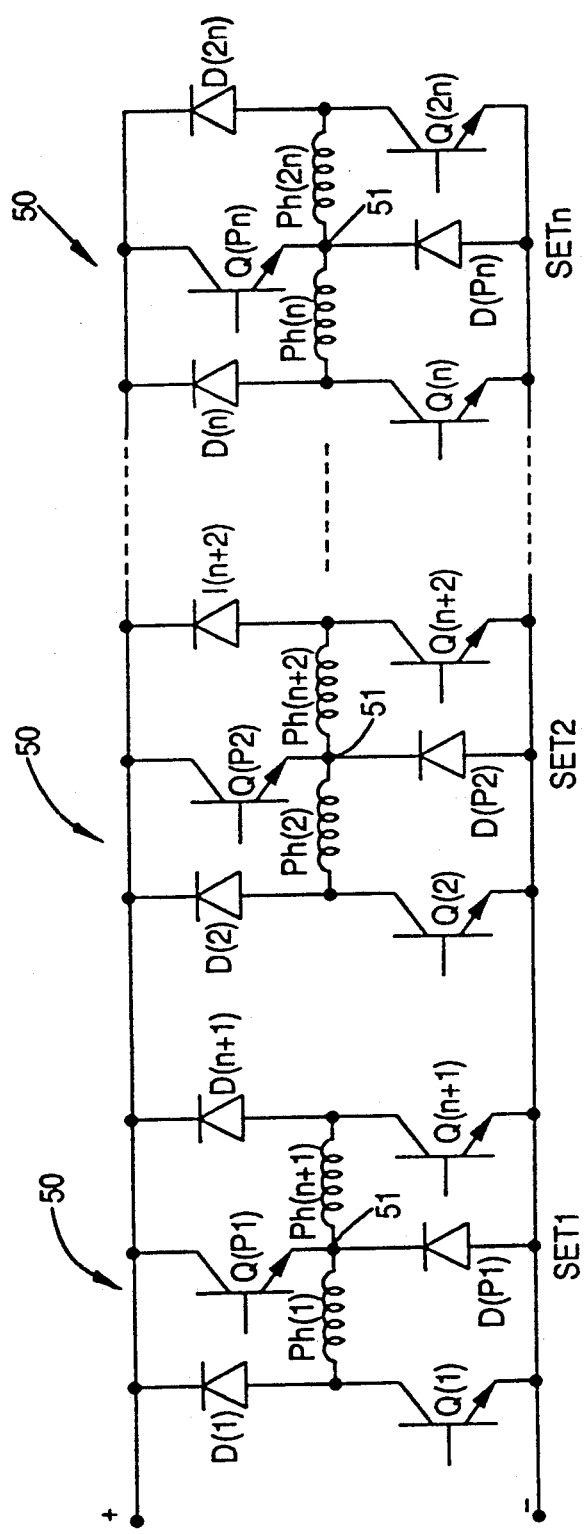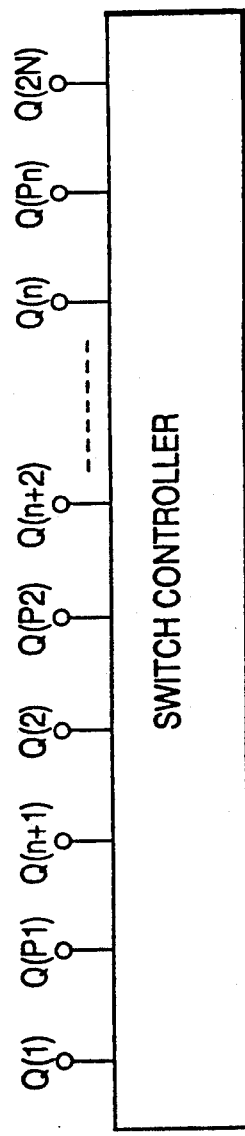
FIG. 4A
FIG. 4B

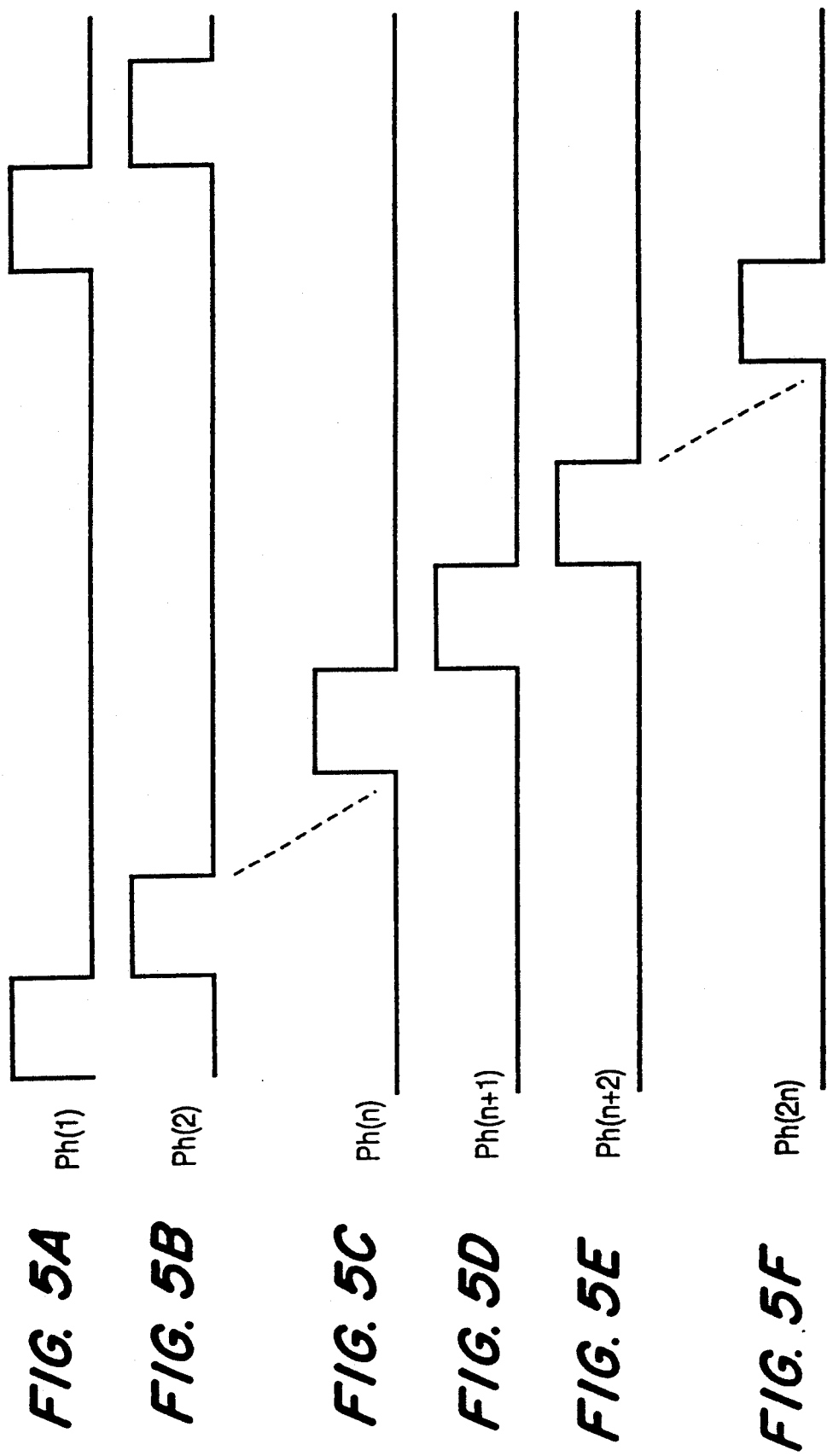

UNIPOLAR CONVERTER FOR VARIABLE RELUCTANCE MACHINES

TECHNICAL FIELD

The present invention relates to circuits for exciting variable reluctance machines.

BACKGROUND ART

The stators and rotors of variable reluctance machines have magnetic saliencies commonly known as salient poles. Such a configuration is commonly called "doubly salient" as illustrated in FIG. 1. Each stator pole 2 is surrounded by a winding of one or more turns of electrically conductive material and appropriate insulation. A phase winding 3 is a pair of series connected windings respectively wound on diametrically opposed poles 2. Only one phase winding 3 is illustrated with it being understood that the remaining pairs of poles each have a phase winding wound on them. The phase windings 3 are grouped together so that a balanced torque is produced in the machine when the windings are excited from an external source of electrical energy and also so that voltage and current requirements of the external source are satisfied. There are no windings of any type or magnets associated with the machine rotor 4. The number of poles 2 on the stator 5 differ from the number of poles 6 on the rotor 4. When the rotor 4 is rotated with respect to the stationary stator poles 2, a variation in reluctance is observed in stator poles. This variation in reluctance is observed as a variation in the inductance of the phase windings 3 which can be readily measured by appropriate instrumentation. Starting from the condition of a stator pole 2 being exactly half way between two rotor poles 6, known as the "unaligned position", the inductance of the phase winding 3 has its minimum value. The unaligned condition in most variable (switched) reluctance machines generally exists throughout an arc of several degrees of rotor rotation. The inductance of the phase winding 3 is fairly constant at its minimum value throughout this arc. Excitation of the phase windings 3 during this rotational period of constant, minimum inductance results in negligible developed torque. As the rotor 4 turns beyond the arc of minimum inductance, the inductance measured in the phase winding 3 increases to a maximum value which is when a pair of rotor and stator poles 2 and 6 are exactly aligned, known as the "aligned position" as illustrated in FIG. 1. When the stator winding 3 is excited with an electrical current as the inductance is increasing from minimum to maximum motor torque is developed on the machine shaft 7. When the phase winding 3 is excited as the inductance is decreasing from maximum to minimum, torque of the opposite direction is developed on the shaft 7. This torque is often termed "generator torque" or "regenerative torque", the latter term being associated with a motor in a braking mode.

In modern variable reluctance machines, switching of the phase windings 3 is accomplished by solid state switching devices generally known as power semiconductors. Specific switching devices include thyristors, transistors, MOSFETS, IGBT's, and many other devices including combinations of the above-mentioned devices. In general, the power semiconductors are operated in an "on/off" mode rather than a linear mode associated with linear amplifiers. The switching times of the power semiconductors are determined by a "logic system" composed of small signal electronic devices and circuits similar to modern computer circuits and systems. The logic system operates in response to various sensors which sense such machine parameters as the position of the rotor poles with respect to the stator poles, current levels in the windings, voltage levels, or other signals required for the desired operation and protection of the machine.

FIG. 2 illustrates a first prior art machine control circuit 10 for driving a four phase variable reluctance machine. Phase windings 12 are sequentially connected between a positive potential 16 and a negative potential 18 of DC power source 14 by closing of switches 20 and 22 which are controlled by a logic (switch) controller (not illustrated). At any one time only one phase winding 12 is energized by its associated switches 20 and 22 being in the on state under the control of control signals applied by the aforementioned logic controller. Freewheel diode 24 is forward biased when the logic controller applies control signals to the switches 20 and 22 to stop the flow of current in the phase winding 12 to which the switches are connected. An induced potential caused by the turning off of the switches 20 and 22 forward biases the freewheel diode 24 and the first diode 26 by inducing a positive potential at terminal 28 of the phase winding 12. The positive potential at terminal 28 causes current flow through the first freewheel diode 24, through the power supply 14 and through diode 26 back to terminal 30 of the phase winding 12. The current flowing in each of the phase windings 12 occurs sequentially under the control of the aforementioned lo logic controller as described above. The motor drive circuit 10 of FIG. 2 has a disadvantage of requiring a pair of switches 20 and 22, a freewheel diode 24 and a first diode 26 for each phase winding 12.

FIG. 3 illustrates a second machine control circuit 40 for a variable reluctance machine. Like reference numerals identify like parts in FIGS. 2 and 3. The number of transistor switches 42 and 44 is equal to the number of phase windings 12. A second diode 44 is connected in series with each of the phase windings 12 to control the flow of current between a pair of switches 42 and 44 which are coupled to different sides of a phase winding 12. A logic (switch) controller (not illustrated) sequentially turns on the pairs of switches 42 and 44 connected to opposite sides of the phase windings to control the flow of current in the phase windings to cause the rotor to rotate. The circuit of FIG. 3 has the disadvantage that the diodes 44 in series with each of the phase windings 12 cause a power loss. Furthermore, the circuit 40 of FIG. 3 does not operate well in an overlapping mode of operation.

DISCLOSURE OF THE INVENTION

The present invention provides an improved circuit for controlling the excitation in a variable reluctance machine having a plurality of phases. A variable reluctance machine in accordance with the invention may be operated as either a motor or a generator. The winding of a phase of the machine has two or more individual windings located symmetrically about the periphery of the stator and wound on salient poles. The two or more individual windings making up a phase winding may be connected in series, parallel, or series/parallel combinations depending upon voltage and current requirements of the switched reluctance machine and its energy source. The number of switches utilized by the present invention is fewer than the circuit of FIG. 2. Furthermore, the diodes 44 of the drive circuit of FIG. 3 are not utilized by the present invention which provides a higher efficiency. With the invention three power switches are used for controlling the flow of current through each set of phase windings of a variable reluctance machine having at least two phases to provide a high efficiency drive circuit. Current flow through diodes does not occur when the switches connected to the diodes are turned on which enhances efficiency as a consequence of power not being dissipated by any diodes. The one terminal of each phase winding, which is not connected to another phase winding, is directly connected to only one switch and one diode.

The invention in a first mode of operation switches phase windings within individual pairs of phase windings sequentially on and off. In this mode of operation a first phase winding in a pair of phase windings is switched on and off followed in time by a second phase winding in the pair of winding being switched on and off. If an odd number of phases exits, a single phase winding, switched by a pair of switches, is turned on and off in a sequence with one or more pairs of phase windings.

The invention may also be operated in a second mode of operation to switch phase windings in an overlapped mode of operational. In an overlapped switched mode of operation the following switching sequence occurs: a first phase winding in a first pair of phase windings is switched on; a first phase winding in a second pair of phase windings is switched on; the first phase winding in the first pair of phase windings is switched off; a second phase winding in the first pair of phase windings is switched on; the first phase winding in the second pair of phase windings is switched off; and a second winding in the second pair of phase windings is switched on. The preceding overlapped switching sequence permits high torque to be developed with a minimal number of power switches. If an odd number of phase windings exists, the odd phase winding which is switched on and off by a pair of switches is switched within the above sequence to overlap current flow through the odd phase winding with one or more of the phase windings within the at least two pairs of phase windings.

BRIEF DESCRIPTION OF THE DRAWINGS

FIGS. 4A-4B illustrate a circuit for exciting a variable reluctance machine having an even number of phase windings in accordance with the present invention.

FIGS. 5A-5F illustrate a timing sequence permitting current overlap in the circuit of FIG. 4.

BEST MODE FOR CARRYING OUT THE INVENTION

Figure 1:
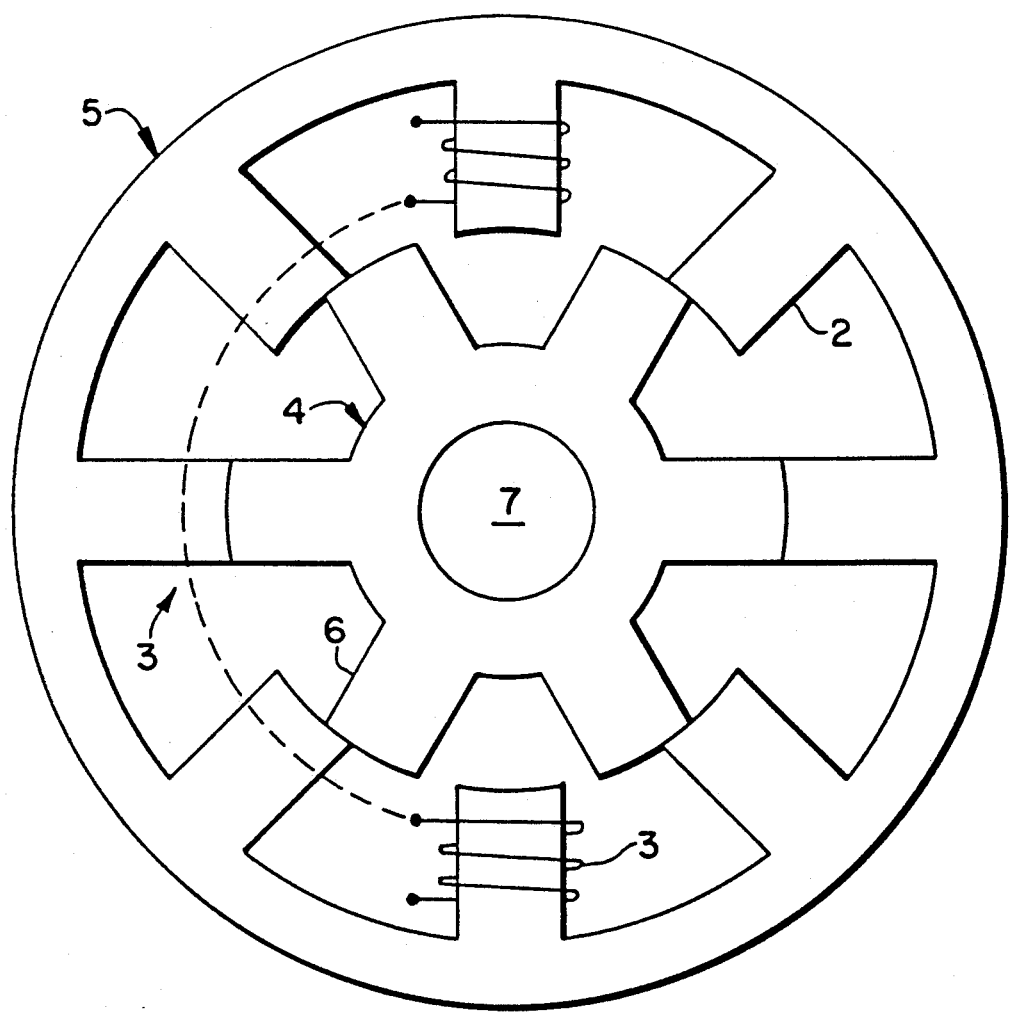
FIG. 1 illustrates a prior art variable reluctance machine having doubly salient poles.
Figure 7A:
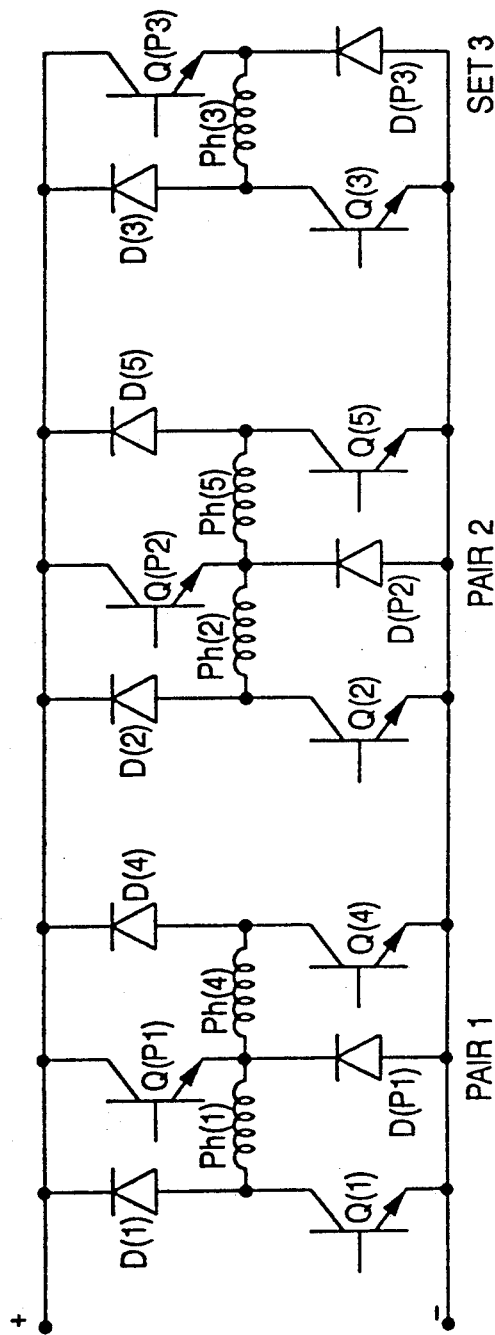
FIGS. 7A-7B illustrate a circuit for exciting a five phase variable reluctance machine.
Figure 7B:
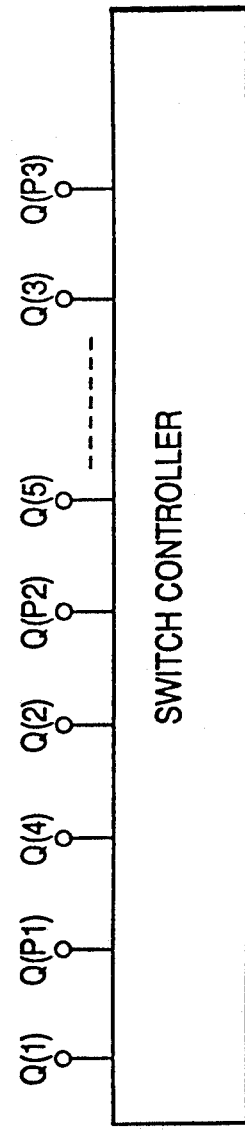

FIG. 4 illustrates a circuit for n sets (pairs) of phase windings for exciting a variable reluctance machine in accordance with the invention wherein n is an integer. Each phase winding is wound on at least two diametrically opposed salient poles as illustrated in FIG. 1. The configuration of the phase-pair control set 50 located farthest to the left in FIG. 4 is explained as follows. In the first phase-pair control set 50 a first switch, Q(P1), is connected between the positive polarity of a DC energy source and a common node 51 to which terminals of two phase windings Ph(1) and Ph(n+1) and the cathode of diode, D(Pl) are also connected. The respective terminals of the phase windings connected to the common nodes 51 are not fixed since variable (switched) reluctance machines operate independently of the magnetic polarity of the stator poles. A second switch, Q(1), is connected between the negative polarity of the DC energy source and a second terminal of the phase winding Ph(1). A third switch, Q(n+1), is connected between the negative polarity of the DC energy source and the second terminal of the phase winding Ph(n+1). The anode of diode, D(P1), is connected to the negative potential of the DC energy source. In addition, the phase-pair control set 50 includes a second diode, D(1), with a cathode connected to the positive polarity of the DC energy source and anode connected to the second terminal of the phase winding Ph (n+1); and a third diode, D(n+1), with a cathode connected to the positive polarity of the DC energy source and anode connected to the second terminal of the phase winding Ph(n+1). Thus, as shown in FIG. 4, the first phase-pair control set 50 of n sets consists of two phase windings, Ph(1) and Ph(n+1); three power switching devices, Q(P1), Q(1), and Q(n+1); and three diodes, D(P1), D(1), and D(n+1). In a variable reluctance machine having an even number of phases, there are n phase-pair control sets 50 with each set controlling a pair of phase windings such as Ph(1) and Ph(n+1). Thus, in a 6-phase machine, there are three sets. In an m-phase machine, where m is an odd number, there are (m−1)/2 phase-pair control sets such as illustrated in FIG. 7 where a five phase machine is illustrated. In a 3-phase machine, there is one phase-pair control set. The switch controller generates control signals on the output leads Q(1) . . . Q(2n) which control the on and off states of power switches having the same identification.

An important aspect of this invention is the time sequence in which the phase windings are excited. In a first mode of operation the individual phase windings within a control set 50 may be sequentially turned on and off followed by the sequential turning on and off of the phase windings in one or more additional control sets 50. In each control set the current flow in each of the phase windings is turned on and totally off before the other phase winding is turned on and off. At no time is current flowing simultaneously in a pair of phase windings within a control set 50.

The two phase windings of a phase-pair control set (50) may also be excited in an overlapping sequence. A sequence included as part of the invention is illustrated in FIG. 5 by the numbering system used in FIG. 4: Ph(1) for set 1, Ph(2) for set 2, Ph(3) for set 3 (not shown), . . . Ph(n) for set n, Ph(n+1) for set 1, Ph(n+2) for set 2, . . . Ph(2n) for set n. The square pulse indicates that the respective winding is energized from the DC source. This sequence is associated with one direction of rotor rotation. To reverse the rotor rotation direction, the timing sequence above is reversed. This sequence permits the safe overlapping of the phase currents—that is, having currents exist with non-zero values in more than one phase at the same instant of time. This feature is useful in achieving optimum phase current wave shapes which help maximize the shaft torque developed by the phase currents. A commonly used example of phase-current overlap is known as pre-firing and post-firing—that is, the condition when phase windings are excited during periods of constant inductance. When phase current overlap is not required or not desired, the windings may be connected sequentially, that is, Ph(1), Ph(2), Ph(3), . . . Ph(2n) from left to right in FIG. 4.

Figure 6:
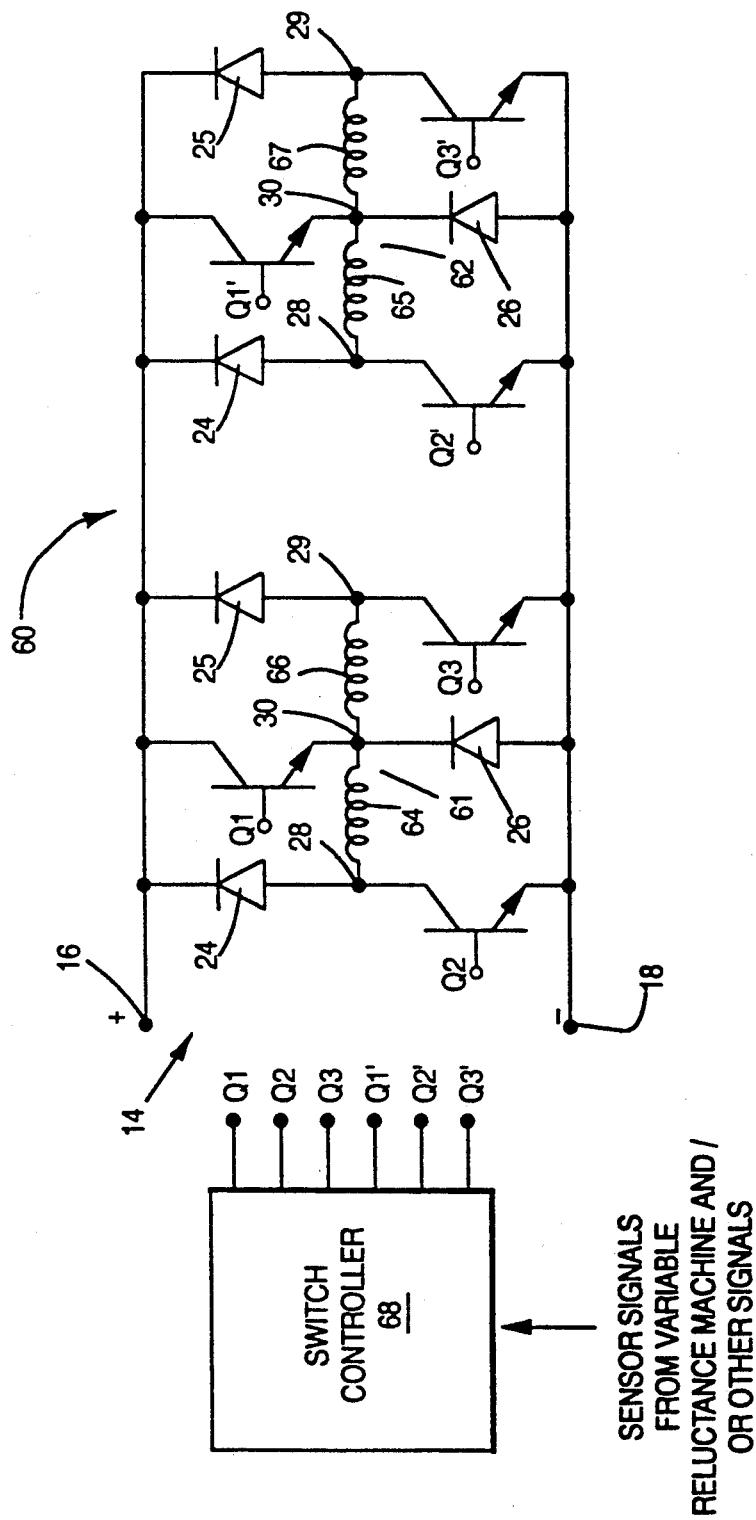
FIG. 6 illustrates a circuit for exciting a four phase variable reluctance machine.

FIG. 6 illustrates a circuit 60 for a 2-phase-pair control set used to excite a variable reluctance machine having four phases. Set 61, includes two phase windings 64 and 66 of the variable reluctance machine, connected to a common node, 30, to which are also connected the cathode of diode 26 and one power terminal of control switch, Q1 (illustrated as a power transistor, but representing any appropriate type of power switching device). The specific power terminal connections for all of the power switching devices illustrated in FIG. 6 depend upon the type of the device, its solid state structure (npn, pnp, 4-layer, etc.), and possible ancillary circuitry required (such as commutation circuitry for thyristors). The second terminal of phase winding 64 is connected to node 28, to which are also connected the anode of diode 24 and one power terminal of switch Q2. The second end of phase winding 66 is connected to node 29, to which are also connected the anode of diode 25 and one power terminal of switch Q3. To the positive terminal 16 of DC energy source 14 are connected the cathode of diode 24, the second power terminal of switch Q1, and the cathode of diode 25. To the negative terminal 18 of DC energy source 14 are connected the second power terminal of switch Q2, the anode of diode 26, and the second power terminal of switch Q3. The internal configuration of set 62, is identical with that of 61. However, the two phase windings of set 65 and 67, are different windings from the windings 64 and 66 of set 1. Set 62 is connected to the positive terminal 16 of the DC energy source 14 through the cathode of a diode 24, one power terminal of switch Q2, and the cathode of diode 25. The negative terminal 18 of DC energy source 14 is connected to the second terminal of the switch Q2', the anode of a diode 26, and the second terminal of switch Q3'. The switches, Q1–Q3', are turned on and off and otherwise controlled by signals produced by the switch controller 68 in response to sensor signals from the variable reluctance machine or other signals.

There are many modes of operation possible with the phase-pair control sets 61 and 62 of FIG. 6. These modes generally concern the control of the current pulse, or exciting pulse, flowing in the machine phase windings, 64 through 67. The timing, magnitude, and duration of the current pulses are determined by the proper switching on or off of the power switches, Q1–Q3 in FIG. 6. The switching is controlled by the switch controller 68 which generates the control signals Q1–Q3' in accordance with prior art techniques and may be in response to the sensor signals, to stored intelligence (such as ROM memory) in a logic system in the controller 68 or in rare cases to manually controlled signals, or to any combination of these control signals. The design of the switch controller 68 including logic system is not part of this invention, except that it must be capable of operating the power switches to provide the current pulse control described herein.

The simplest type of current pulse control, known as the single-pulse mode, is achieved in one phase of set 61, as follows: Q1 and Q2 are turned on causing current to flow through winding 64 from node 30 to node 28. The instant of turn-on is determined by the switch controller 68. For motor operation this instant will be controlled to occur during or just following the period of minimum machine inductance. For generator operation, this instant will be controlled to occur at or just following the condition of maximum machine inductance. Current flow through winding 64 exists until the power switches Q1 and Q2 are turned off by the switch controller. The time duration of current flow in phase winding 64 determines the machine torque contribution from phase winding 64 and its associated poles. When switches Q1 and Q2 are turned off, there is generally some energy remaining in winding 64. This energy is returned to the energy source 14 immediately following turn-off through the path 64 - 24 - 16- 14- 18 -26. The current in this portion of the single-current pulse generally decreases rapidly to zero, depending upon such factors as the source voltage level, number of turns in phase winding 64, etc.

At some time during the current pulse in phase winding 64, the poles of the second phase of the machine phase winding 65 will come into a position such that torque can be produced in that phase. For the configuration shown in FIG. 1, the period of increasing inductance (and decreasing inductance) is a rotor rotation of 22.5 deg. For motor action, when the rotor has rotated through 15 deg., the next phase can be excited (or slightly before this amount of rotation if pre-firing is to be used). Thus, in FIG. 6, while current may be still flowing in winding 64, winding 65 can be energized by turning on Q1' and Q2' and useful torque will be generated in winding 65 and its associated poles. The subsequent current pulse in phase winding 65 will be identical to that described for phase winding 64, but using the control components associated with winding 65.

After about 2/3rds of the duration of the current pulse of phase winding 65, the next phase winding will be at the condition of pole alignment for excitation. This third phase winding in a 2-phase-pair control set is located in set 61 and is phase winding 66 in FIG. 6. By this instant of time, the current in phase winding 64 should be zero. Phase winding 66 is energized by turning on switch Q1 and Q3, and current flow phase winding 66 is from node 30 to node 29. Turn-off of switches Q1 and Q3 causes energy return to the source 14 through the path 66 - 25 - 16 -14 - 18 - 26. Finally, the fourth phase winding 67 is energized about 2/3rds completed, this sequence of switching events will be repeated, starting with phase winding 64. One such sequence of switching events occurs during a rotor rotation of 60 deg. in the configuration of FIG. 1. Therefore, there are six such sequences per revolution of the rotor and $6 \times 4 = 24$ current pulses per revolution.

A second current pulse control mode is the single pulse with freewheeling. This is used to extend the current pulse duration over a longer portion of the period of increasing or decreasing inductance without having the current build up to an excessively large magnitude. Returning to the description of the single pulse in phase winding 64 described above, instead of turning off both switches Q1 and Q2 to end the current pulse, only switch Q1 is turned off by the logic system. This causes a relaxed condition known as freewheeling as the energy remaining in phase winding 64 causes current flow through the path 64 - Q2 - 26. This condition can be terminated at any time by turning off Q2 with the remaining energy in phase winding 64 being returned to the energy source 14 as in the single pulse.

A third current pulse control mode includes multiple freewheeling strokes during the duration of a current pulse. This mode is termed "chopping" and results in a "zig-zag" current pulse shape. It is applicable at relatively low speeds where the time duration of increasing or decreasing inductance is relatively long. In this mode, as the current decreases during the freewheeling stroke described in the previous paragraph, the current can be increased again by turning on switch Q1 and drawing energy from the source 14. When the current again increases to a pre-determined maximum value, switch Q1 can be turned off and freewheeling will again be initiated through path 64 - Q2 - 26 as before. This process can be repeated as long as desired. The pulse is ended by turning off both switches Q1 and Q2 as before.

FIG. 7 illustrates an embodiment of the invention having five phase windings Ph(1), Ph(4), Ph(2), Ph(5) and Ph(3). The embodiment is identical to the embodiment of FIG. 6 except that an additional phase winding Ph(3), additional first and second power switches Q(3) and Q(P3), and additional freewheeling diodes D(3) and D(P3) having been added to control the current flow in phase winding Ph(3). The sequence of current flow may be sequential, overlapping, freewheeling or multiple freewheeling. Overlapping current flow may not be used with a three phase embodiment containing one pair of phase windings.

Figure 2:
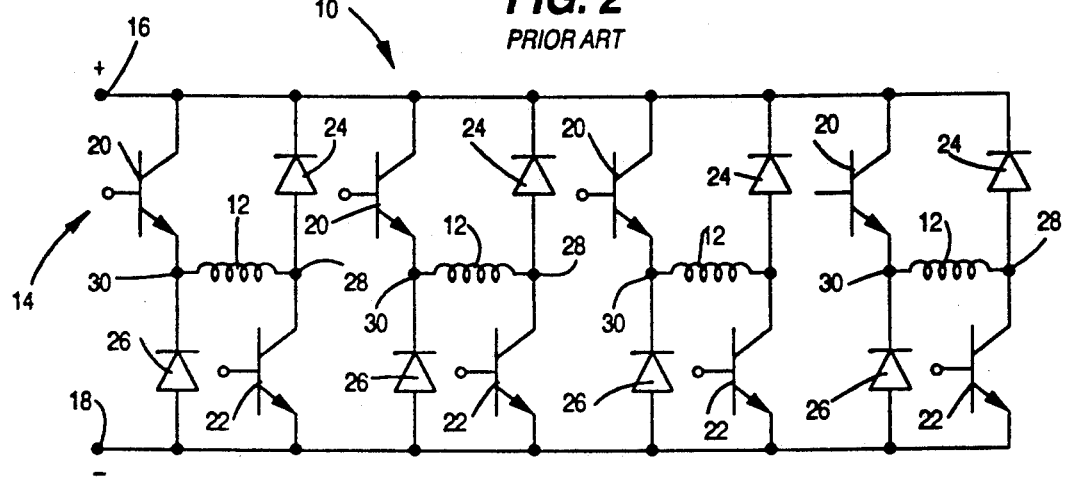
FIG. 2 illustrates a prior art circuit for exciting a variable reluctance motor.
Figure 3:
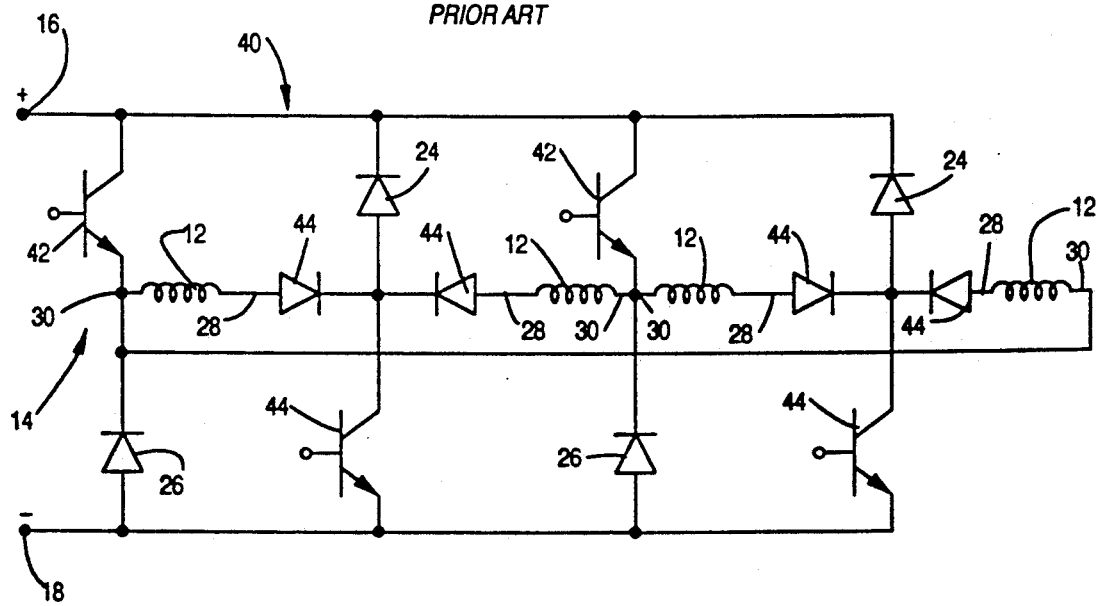
FIG. 3 illustrates a prior art circuit for exciting a variable reluctance motor.

The invention provides a high efficiency excitation circuit for a variable reluctance machines having n pairs of phase windings. The number of transistor switches is less than the prior art of FIG. 2 and the efficiency of operation is higher than the prior art of FIG. 3 as a consequence of the pairs of phase windings not being in series with the diode 44 of FIG. 3. Current flow through diodes does not occur when switches connected to each phase winding are turned on which enhances efficiency as a consequence of power not being dissipated by any diodes. The one terminal of each phase, which is not connected to another phase winding, is directly connected to only one switch and one diode. Thus with respect to the phase windings of FIGS. 4, 6 and 7 the second terminal is directly connected to only one switch and one diode.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A circuit for controlling the flow of current in a variable reluctance machine comprising:
   n sets of phase windings with n being an integer with a first phase winding and a second phase winding of each set of phase windings having first and second terminals with the first terminals of the first and second phase windings being connected together in a common node;
   n first switches, each first switch having a first electrode for connection to a first DC potential, a second electrode connected to a common node of a different set of phase windings, and a control electrode for controlling the turning on and off of the first switch;
   n second switches, each second switch having a first electrode connected to a second terminal of a different first phase winding, a second electrode for connection to a second DC potential and a control electrode for controlling the turning on and off of the second switch; and
   n third switches, each third switch having a first electrode connected to a second terminal of a different second phase winding, a second electrode for connection to the second DC potential, and a control electrode for controlling the turning on and off of the third switch; and wherein
   the second terminal of each phase winding is directly connected to only one of the second and third switches and to a first electrode of a diode with a second electrode of the diode for connection to the first DC potential.

2. A circuit in accordance with claim 1 further comprising:
   n first and second freewheeling diodes, each first freewheeling diode having a first electrode connected to the first terminal of a different first phase winding and a second electrode for connection to the first DC potential and each second freewheeling diode having a first electrode connected to the second terminal of a different second phase winding and a second electrode for connection to the second DC potential.

3. A circuit in accordance with claim 1 further comprising:
   n first didodes, each first diode having a first electrode for connection to the second DC potential and a second electrode connected to the common node of a different set of phase winding.

4. A circuit in accordance with claim 2 further comprising:
   n first diodes, each first diode having a first electrode for connection to the second DC potential and a second electrode connected to the common node of a different set of phase windings.

5. A circuit in accordance with claim 1 wherein:
   the switches are transistors, the first DC potential is positive and the second Dc potential is negative.

6. A circuit in accordance with claim 2 wherein:
   the switches are transistors, the first DC potential is positive, the second DC potential is negative, the first electrode of the diodes is an anode and the second electrode of the diodes is a cathode.

7. A circuit in accordance with claim 3 wherein:
   the switches are transistors, the first DC potential is positive, the second DC potential is negative, the first electrode of the didoes is an anode and the second electrode of the diodes is a cathode.

8. A circuit in accordance with claim 4 wherein:
   the switches are transistors, the first DC potential is positive, the second DC potential is positive, the second DC potential is negative, the first electrode of the diodes is an anode and the second electrode of the diodes is a cathode.

9. A circuit in accordance with claim 1 wherein:
   a switch controller for providing control signals to the control electrodes of the switches for controlling the turning on and off of each first, second and third switch connected to a different set of first and second phase windings to produce current flow in the set of first and second phase windings to which each first, second and third switch is connected by turning the first and second switches on and off, followed by turning the first and third switches turning on and off.

10. A circuit in accordance with claim 2 wherein:
a switch controller for providing control signals to the control electrodes of the switches for controlling the turning on and off of each first, second and third switch connected to a different set of first and second phase windings to produce current flow in the set of first and second phase windings to which each first, second and third switch is connected by turning the first and second switches on and off followed by turning the first and third switches turning on and off.

11. A circuit in accordance with claim 3 wherein:
a switch controller for providing control signals to the control electrodes of the switches for controlling the turning on and off of each first, second and third switch connected to a different set of first and second phase windings to produce current flow in the set of first and second phase windings to which each first, second and third switch is connected by turning the first and second switches on and off, followed by turning the first and third switches turning on and off.

12. A circuit in accordance with claim 5 wherein:
a switch controller for providing control signals to the control electrodes of the switches for controlling the turning on and off of each first, controlling the turning on and off of each first, second and third switch connected to a different set of first and second phase windings to produce current flow in the set of first and second phase windings to which each first, second and third switch is connected by turning the first and second switches on and off followed by the first and third switches turning on and off.

13. A circuit in accordance with claim 1 further comprising:
an additional phase winding having first and second terminals;
an additional first switch having a first electrode for connection to the first DC potential, a second electrode connected to the first terminal of the additional phase winding and a control electrode for controlling the turning on and off of the additional switch; and
an additional second switch having a first electrode for connection to the second DC potential, a second electrode connected to the second terminal of the additional phase winding and a control electrode for controlling the turning on and off of the additional switch.

14. A circuit in accordance with claim 13 further comprising:
an additional first and second freewheeling diode, the additional first freewheeling diode having a first electrode connected to the first terminal of the additional phase winding and a second electrode for connection to the first DC power potential and the second additional free wheeling diode having a first electrode connected to the second terminal of the additional phase winding and a second electrode for connection to the second potential.

15. A circuit in accordance with claim 13 wherein the switch controller provides control signals to the control electrodes of the additional first and second switches for controlling the turning on and off of the additional first and second switches.

16. A method of controlling flow of current in a variable reluctance machine having n sets of phase windings with n being an integer with a first phase winding and a second phase winding of each set of phase windings having first and second terminals with the first terminals of the first and second phase windings being connected together in a common node, n first switches, each first switch having a first electrode for connection to a first DC potential, a second electrode for connection to a common node of a different set of phase windings, and a control electrode for controlling the turning on and off of the first switch, n second switches, each second switch having a first electrode connected to a second terminal of a different first phase winding, a second electrode for connection to a second DC potential and a control electrode for controlling the turning on and off of the second switch, and n third switches, each third switch having a first electrode connected to a second terminal of a different second phase winding, a second electrode for connection to the second DC potential, a control electrode for controlling the turning on and off of the third switch and the second terminal of each phase winding is directly connected to only one of the second and third switches and to a first electrode of a diode with a second electrode of the diode for connection to the first DC potential comprising the steps in sequence in time:
turning on the first and second switches connected to a first phase winding in a first set of phase windings;
turning on the first and second switches connected to a first phase winding in a second set of phase windings;
turning off the first and second switches connected to the first phase winding in the first set of phase windings;
turning on the first and third switches connected to the second phase winding in the first set of phase windings;
turning off the first and second switches connected to the first phase winding in the second set of phase windings;
turning on the first and third switches connected to the second phase winding in the second set of phase windings;
turning off the first and third switches connected to the second phase winding in the first set of phase windings; and
turning off the first and third switches connected to the second phase winding in the second set of phase windings.

17. A method of controlling flow of current in a variable reluctance machine having n sets of phase windings with n being an integer with a first phase winding and a second phase winding of each set of phase windings having first and second terminals with the first terminals of the first and second phase windings being connected together in a common node, n first switches, each first switch having a first electrode for connection to a first DC potential, a second electrode connected to a common node of a different set of phase windings, and a control electrode for controlling the turning on and off of the first switch, n second switches, each second switch having a first electrode connected to a second terminal of a different first phase winding, a second electrode for connection to a second DC potential and a control electrode for controlling the turning on and off of the second switch, and n third switches, each third switch having a first electrode connected to a second terminal of a different second phase winding, a second electrode for connection to the second DC potential, a control electrode for controlling the turning on and off of the third switch and the second terminal of each phase winding is directly connected to only one of the second and third switches and to a first electrode of a diode with a second electrode of the diode for connection to the first DC potential comprising the steps in sequence in time:
- turning on and off the first and second switches connected to a first phase winding in a first set of phase windings;
- turning on and off the first and third switches connected to a second phase winding in the first set of phase windings;
- turning on and off the first and second switches connected to a first phase winding in a second set of phase windings; and
- turning on and off the first and third switches connected to a second phase winding in the second set of phase windings.

18. A method for controlling the flow of current in a variable reluctance machine having first and second phase windings each having first and second terminals with the first terminal of the phase windings being connected together at a common node, a first switch having a first electrode for connection to a first DC potential, a second electrode connected to the common node and a control electrode for controlling turning on and off of the first switch, a second switch having a first electrode connected a second terminal of the first phase winding, a second electrode for connection to a second DC potential and a control electrode for controlling turning on and off of the second switch, and a third switch having a first electrode connected to a second terminal of the second phase winding, a second electrode for connection to the second DC potential, a control electrode for controlling turning on and off of the third switch and the second terminal of each phase winding is directly connected to only one of the second and third switches and to a first electrode of a diode with a second electrode of the diode for connection to the first DC potential comprising the steps in sequence in time:
- turning the first and second switches on to cause current to flow in the first phase winding; and
- turning off the first switch to cause current to flow from the first phase winding through the second switch back to another terminal of the first phase winding.

19. A method in accordance with claim 18 wherein: the first switch is turned on after being previously turned off.

20. A method for controlling the flow of current in a variable reluctance machine having first and second phase windings each having first and second terminals with the first terminal of the phase windings being connected together at a common node, a first switch having a first electrode for connection to a first DC potential, a second electrode connected to the common node and a control electrode for controlling turning on and off of the first switch, a second switch having a first electrode connected a second terminal of the first phase winding, a second electrode for connection to a second DC potential and a control electrode for controlling turning on and off of the second switch, and a third switch having a first electrode connected to a second terminal of the second phase winding, a second electrode for connection to the second DC potential, a control electrode for controlling turning on and off of the third switch and the second terminal of each phase winding is directly connected to only one of the second and third switches and to a first electrode of a diode with a second electrode of the diode for connection to the first DC potential comprising the steps in sequence in time:
- turning on and off the first and second switches; and
- turning on and off the first and third switches.

21. A circuit for controlling the flow of current in a variable reluctance machine comprising:
- first and second phase windings each having first and second terminals with the first terminal of the phase windings being connected together at a common node;
- a first switch having a first electrode for connection to a first DC potential, a second electrode connected to the common node and a control electrode for controlling turning on and off of the first switch,
- a second switch having a first electrode connected a second terminal of the first phase winding, a second electrode for connection to a second DC potential and a control electrode for controlling turning on and off of the second switch, and
- a third switch having a first electrode connected to a second terminal of the second phase winding, a second electrode for connection to the second DC potential, and a control electrode for controlling turning on and off of the third switch; and wherein the second terminal of each phase winding is directly connected to only one of the second and third switches and to a first electrode of a diode with a second electrode of the diode for connection to the first DC potential.

22. A circuit in accordance with claim 21 further comprising:
- first and second freewheeling diodes, the first diode having a first electrode connected to the second terminal of the first phase winding and a second electrode for connection to the first DC potential and the second diode having a first electrode connected to the second terminal of the second phase winding and a second electrode for connection to the first DC potential.

23. A circuit in accordance with claim 21 further comprising:
- a first diode having a first electrode for connection to the second DC potential and second electrode connected to the common node of the phase windings.

24. A circuit in accordance with claim 22 further comprising:
- a first diode having a first electrode for connection to the second DC potential and a second electrode connected to the first terminals of the phase windings.

25. A circuit in accordance with claim 21 wherein: the switches are transistors, the first DC potential is positive and the second DC potential is negative.

26. A circuit in accordance with claim 22 wherein: the switches are transistors, the first DC potential is positive, the second DC potential is negative, the first electrode of the diodes is an anode and the second electrode of the diodes is a cathode.

27. A circuit in accordance with claim 23 wherein: the switches are transistors, the first DC potential is negative, the first electrode of the diodes is an anode and the second electrode of the diodes is a cathode.

28. A circuit in accordance with claim 24, wherein:
the switches are transistors, the first potential is positive, the second DC potential is positive, the second DC potential is negative, the first electrodes of the diodes is an anode and the second electrode of the diodes is a cathode.

29. A circuit in accordance with claim 21 further comprising:
a switch controller for providing control signals to the switches for controlling the turning on and off of the switches to produce current flow in the phase windings by turning the first and second switches on and off, followed by turning the first and third switches on and off.

30. A circuit in accordance with claim 25 further comprising:
a switch controller for providing control signals to the switches for controlling the turning on and off of the switches to produce current flow in the phase windings by turning the first and second switches on and off, followed by turning the first and third switches on and off.

* * * * *